Oct. 4, 1949.    J. M. HUSH    2,483,543
SYNCHRONOUS ELECTRIC MOTOR
Filed May 14, 1948    2 Sheets-Sheet 1
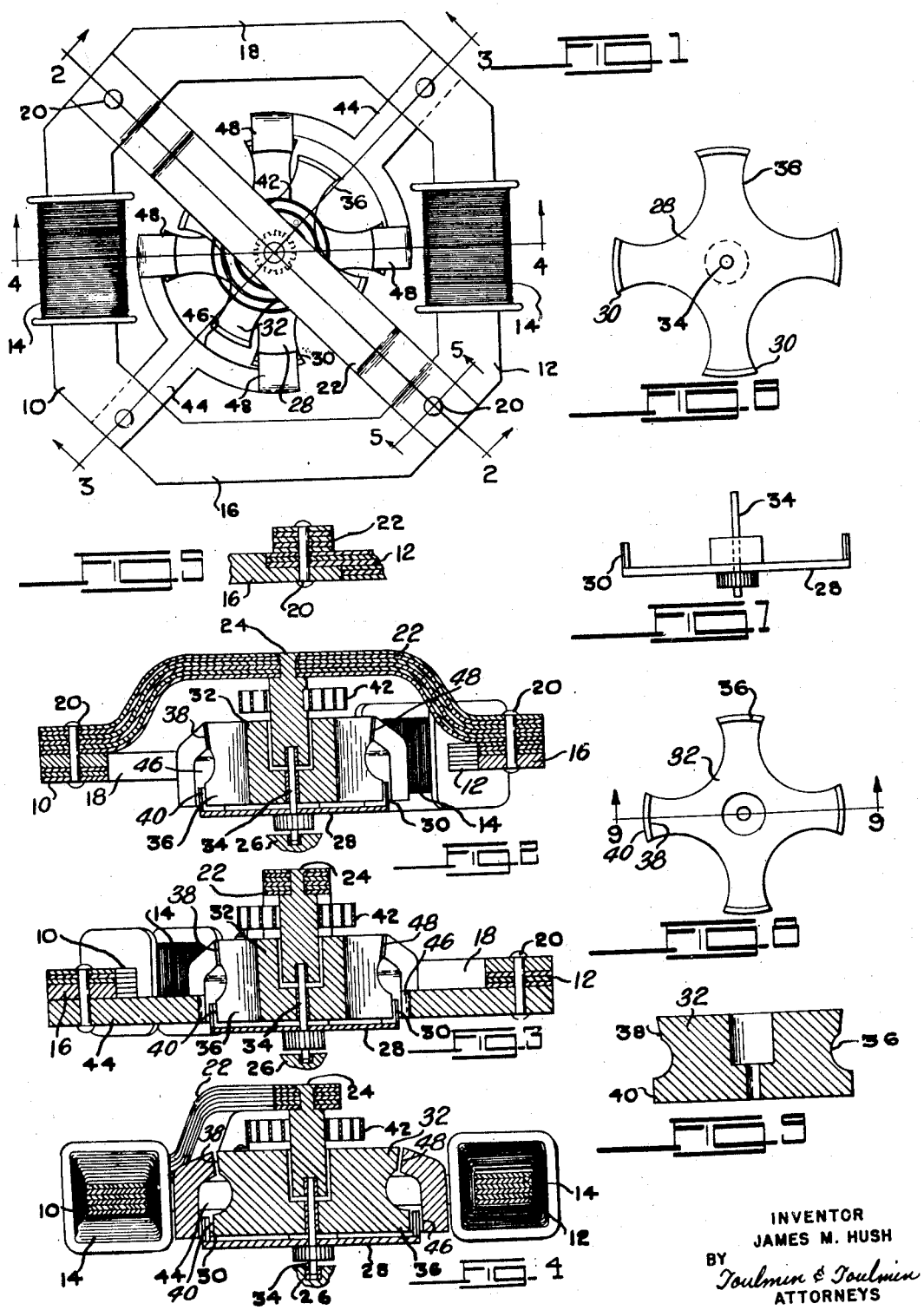
INVENTOR
JAMES M. HUSH
BY Toulmin & Toulmin
ATTORNEYS

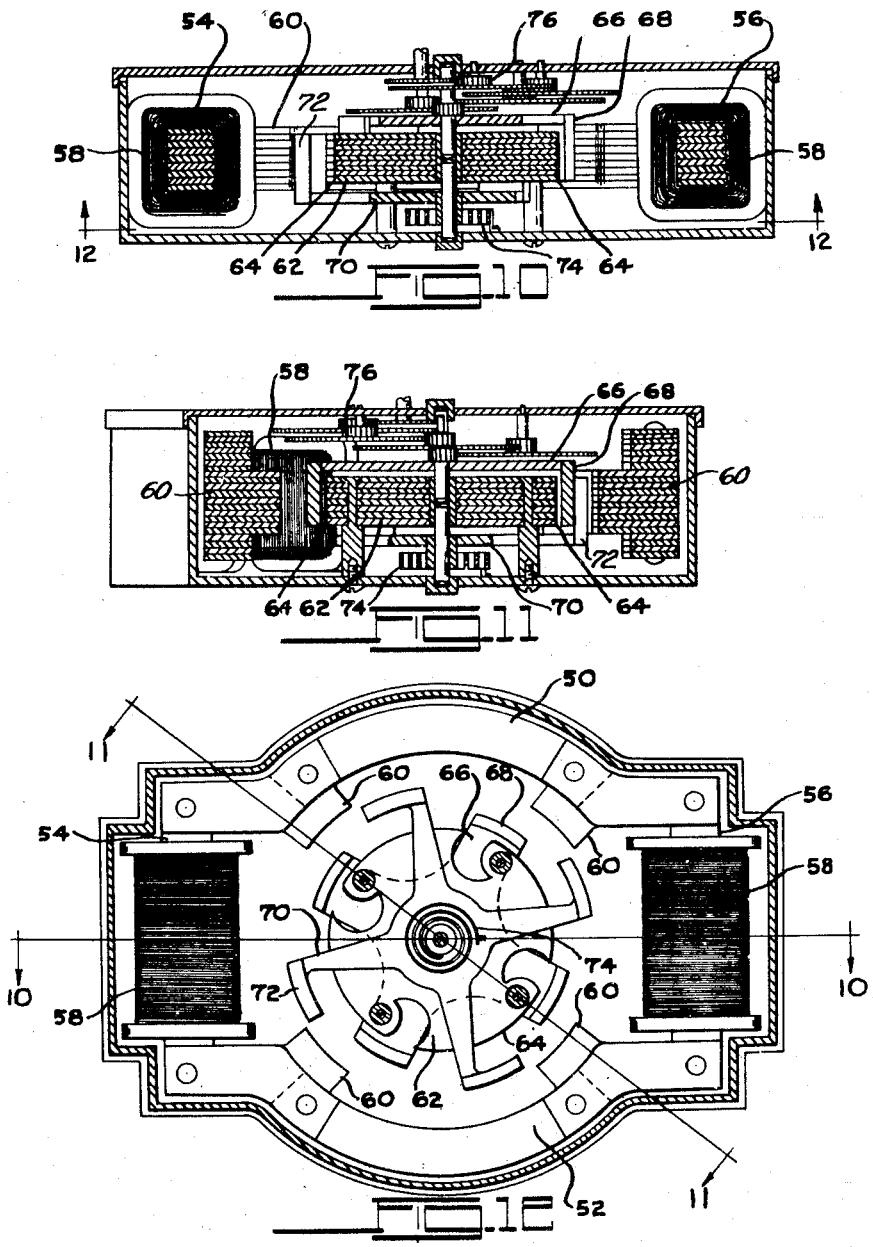

Patented Oct. 4, 1949

2,483,543

UNITED STATES PATENT OFFICE 2,483,543

SYNCHRONOUS ELECTRIC MOTOR

James M. Hush, Dayton, Ohio, assignor to Hansen Manufacturing Company, Princeton, Ind., a corporation of Indiana Application May 14, 1948, Serial No. 27,037

15 Claims. (Cl. 172—278)

This invention relates to electric motors, and particularly to alternating current electric motors adapted for use as the motive force for clocks and timers and the like.

One objection to most small alternating current motors for clocks and timers is that they operate at a very low efficiency and thus cause considerable waste of power.

One reason for the motors operating at a very low degree of efficiency is that they generally operate on the principle of having spaced field poles which alternate periodically in polarity and which transmit motive power to a rotor by attracting pole portions thereof as the rotor rotates and carrying the said pole portions past the field poles.

Due to the fact that the pole parts of the rotor must be slightly out of alignment with the field poles, in order to have a thrust exerted thereon in the proper direction, they operate in a relatively weak field and a considerable amount of magnetomotive force of the field structure is dissipated in establishing leakage flux.

One of the primary objects of the instant invention is to provide a small alternating motor of the synchronous type which is much more efficient in operation than motors of the prior art.

Still another object is the provision of a low speed synchronous motor which is extremely efficient in operation.

It is also an object to provide a low speed synchronous motor for clocks or timers which is quiet in operation and which operates at low speed thereby having long life.

It is another object to provide a self-starting synchronous motor which will always run in one direction and without the use of shading coils, phase splitting devices, and other similar and well known arrangements.

A still further object is the provision of an improved method of converting alternating electric power into mechanical power and to do so with a high degree of efficiency.

These and other objects and advantages will become more apparent upon reference to the following description taken in connection with the accompanying drawings in which:

Figure 1 is a plan view of one form of motor constructed according to this invention;

Figure 2 is a vertical section indicated by the line 2—2 on Figure 1;

Figure 3 is a vertical section indicated by the line 3—3 on Figure 1;

Figure 4 is a vertical section indicated by the line 4—4 on Figure 1;

Figure 5 is a vertical section indicated by the line 5—5 on Figure 1;

Figure 6 is a plan view over the rotary armature of Figure 1;

Figure 7 is a side view thereof;

Figure 8 is a plan view showing the oscillatory armature of the motor of Figure 1;

Figure 9 is a vertical section therethrough indicated by the line 9—9 on Figure 8;

Figure 10 is a vertical section showing another form which the motor of this invention can take and as indicated by the line 10—10 on Figure 12;

Figure 11 is a view similar to Figure 10 and as indicated by the line 11—11 on Figure 12; and Figure 12 is a transverse section indicated by the line 12—12 on Figure 10 and showing the several operative components of the motor.

Referring to Figures 1 through 9, the motor shown therein consists, in general, of a field structure having the laminated parts 10 and 12 on which are placed the exciting coils 14. The ends of the parts 10 and 12 are connected by the permanent magnet members 16 and 18.

As shown in Figure 5, the ends of the parts 10 and 12 preferably overlap and are fitted against the adjacent ends of the magnet parts 16 and 18 and are secured thereto by rivets or screws 20. A laminated bridge member 22 is also provided bridging two of the opposite corners of the magnetic frame. The bridge member, as will be seen in Figures 2, 3 and 4, has a post 24 secured to the center part thereof and extending downwardly therefrom. This post is of magnetic material and comprises a portion of the magnetic circuit of the motor as will be seen hereinafter.

Journaled between the lower end of the post 24 and a stationary frame part 26 is a rotor member 28 which comprises a central non-magnetic spider and axially extending magnetic pole parts 30. The pole parts 30 surround the lower edge of an oscillatory member 32 which is of magnetic material and which may be journaled as shown on the shaft 34 of the rotary armature.

The oscillatory member 32, as will be seen in Figure 8, is formed to have a plurality of poles 36 which substantially correspond in circumferential extent to the poles 30 of the rotary armature. It will be seen in Figures 2, 3, 4 and 9 that the poles 36 of the oscillatory member 32 are generally divided into upper and lower parts as at 38 and 40. The parts 40 of the poles are those which directly cooperate with the poles 30 of the rotary armature, while the upper parts 38 cooperate with stationary field poles as will be seen hereinafter.

The oscillatory member 32 is resiliently urged toward a predetermined position by a torsion spring 42 which has one end connected to the post 24 and its other end connected with the said oscillatory member.

It will be understood that the mass of the oscillatory member and the torsion spring 42 are so adjusted that the oscillatory member will have a free oscillatory period of a certain value depending on the particular speed at which the motor is to operate.

Returning to the stationary field structure, it will be seen that the bridge 22 connects two of the opposite junctures between the parts 10 and 12 and the permanent magnets 16 and 18, while extending from the other two opposite junctures are a pair of pole members 44. These pole members have arcuate inner faces 46 formed to be concentric with the rotor 28 and oscillatory member 32, and each is of substantially greater arcuate extent than the poles 30 of the armature or the poles 36 of the oscillatory member.

In addition to the main pole faces 46 each of the pole members 44 includes the auxiliary pole parts 48 which, as will be seen in Figures 2, 3 and 4, are disposed substantially upwardly above the poles 30 of the armature and the pole parts 40 of the oscillatory member 32. These pole parts 48 are for the purpose of cooperating with the upper pole parts 38 of the oscillatory member 32 and are accordingly positioned substantially coplanar therewith.

The motor is shown in Figure 1 in a rest position and it will be noted that the pole parts 38 of the oscillatory member are disposed at an angle of substantially 25 degrees to the pole parts 48 of the stationary field structure.

It will be evident that energization of the stationary field structure will cause the oscillatory member to move in a clockwise direction toward a position where the pole parts 38 will line up with the pole parts 40. During this movement the ones of the pole parts 40 of the oscillatory member which are in alignment with the pole faces 46 will remain in fixed magnetic relationship therewith. It will be obvious that the greatest field strength between the pole faces 46 and the oscillatory member will be in the space between the said pole faces and the tips of the poles 40 of the oscillatory member. Because of this the pole parts 30 of the armature will tend to position themselves directly between the pole parts 40 of the oscillatory member and the arcuate pole faces 46. As the oscillatory member is moved in a clockwise direction the rotary armature therefor moves with it.

To operate the motor of Figures 1 through 9, the coils 14 are supplied with alternating current. The size of the coils 14 is so adjusted relative to the permanent magnets 16 and 18 that the magnetomotive force of each of the said coils will exactly equal the magnetic strength of one of the permanent magnets. Thus, when the adjacent poles of the parts 10 and 12 and the permanent magnets 16 and 18 are like, a high magnetomotive force is developed between the junctures bridged by the bridge 22 and the other two opposite junctures of the stationary magnetic frame. This causes a high field strength to stand between the pole faces 46 and the oscillatory member 32.

When the ends of the parts 10 and 12 of the field structure are dissimilar in polarity to the adjacent ends of the permanent magnets 16 and 18, then the said magnets and the said parts 10 and 12 merely act as keepers or shunts for each other and the field strength between the pole faces 46 and the oscillatory member is nil. Thus, during one-half cycle of the energizing current supplied to the coils 14 there is no field strength between the pole faces 46 and the oscillatory member. During the other half cycle there is a strong field between the said pole face and oscillatory member.

Assuming that energizing current is supplied to the coils 14 from a standard 60 cycle commercial supply, then there will be 3,600 magnetic impulses exerted on the oscillatory member 32 each minute. Each oscillation of the member 32 advances the rotary armature 28 one pole and thus this member will rotate at 900 R. P. M. It will be obvious that this rate of speed could be increased or reduced as desired by varying the particular arrangements of the stationary field structure and the pole parts on the rotary armature.

It will also be evident that a substantial amount of the energizing current supplied to the coils 14 will be utilized in driving the armature 28, because during the time the said armature is being driven by an oscillatory movement of the member 32 it is in a strong field. In essence, the said armature is locked to the oscillatory member during the peaks of field structure between the pole faces 46 and the rotary member and is released therefrom during the time the said field strength is nil.

Another form which the motor of this invention may take is illustrated in Figures 10 through 12. In these figures the stationary magnetic frame comprises the oppositely disposed and permanently magnetized portions 50 and 52 and the soft iron portions 54 and 56 interconnecting the ends of the said permanent magnetized portions.

The soft iron portions of the magnetic structure have the coils 58 thereon and, as in the case of the modification of Figures 1 through 9, excitation of the field structure by an alternating current in the coils 58 results in the shunting of the magnetic flux around the said structure during one-half cycle of current and the establishment of a high magnetomotive force between opposite corners of the structure on the other half cycle of current.

In the modification shown in Figures 10 through 12 each of the aforementioned opposite corners has a stationary pole part 60 extending inwardly therefrom and these pole parts are of relatively short circumferential length. Spaced inwardly from the pole 60 is a stationary member 62 having pole parts 64 thereon of substantially greater axial length than the pole 60.

Rotatably supported coaxially with the member 62 is a rotary armature 66 having magnetic pole parts 68 extending from the rear thereof and axially across the face of the poles 64. Also mounted coaxially with the member 62 is an oscillatory member 70 having pole parts extending axially from its rim as at 72 into the annular space between the pole parts of the armature and the stationary field poles 60. The member 70 is normally urged by the torsion spring 74 in substantially the position shown in Figure 12 and wherein the said pole parts thereof are displaced angularly from the stationary poles 60. This displacement, it will be noted, is less than 90 electrical degrees and thus, upon the establishment of a pulsating magnetomotive force in the stationary field structure the member 70 will oscillate, as was the case with the oscillatory member 36 in the first modification described.

As in the case of the first modification, the mass of the member 70 and the resiliency of the torsion spring 74 are so adjusted relative to each other that the natural period of oscillation of the said member is at the same frequency as the pulsations of magnetomotive force at the poles 60. This causes the member 70 to move in a counter-clockwise direction when the said magnetomotive force is high and to move in the opposite direction when the said magnetomotive force is weak. This, in effect, causes the lines of force threading the pole 64 to move circumferentially thereabout. Since these lines of force link the magnetic poles 68 of the armature, it will be evident that the armature will be driven in a counter-clockwise direction. Since the field is weak when the member 70 oscillates in a clockwise direction, there is little or no tendency to retard the counter-clockwise rotation of the armature. The armature continuously rotates in one direction and only one direction and at synchronous speed. It will be evident that the armature shaft could have connected thereto any suitable gearing arrangement as indicated at 76 for the purpose of driving a clockwork or timer mechanism or any other device which it was desired to power.

It will be understood that this invention is susceptible to modification in order to adapt it to different usages and conditions and, accordingly, it is desired to comprehend such modifications within this invention as may fall within the scope of the appended claims.

I claim:

1. In an electric motor; a field comprising a stationary pole and a movable pole of substantially less circumferential length spaced therefrom, an armature having a magnetic part disposed to move between said poles, means for establishing a pulsating magnetomotive force between said poles, and means resiliently biasing said movable pole toward a predetermined position out of alignment with said stationary pole, said biasing means having a modulus such as to cause said movable pole to oscillate in unison with the pulsations of the said magnetomotive force.

2. In an electric motor; a field comprising a stationary pole and a movable pole, said movable pole being of substantially less circumferential length than said stationary pole and being spaced therefrom, an armature having a magnetic rim part disposed to move in the space between said poles, means for establishing a pulsating magnetomotive force between said poles and across the said space, and means for causing said movable pole to oscillate in unison with the pulsations of said magnetomotive force, said last mentioned means comprising resilient means continuously urging said movable pole toward a predetermined position out of alignment with said stationary pole, and auxiliary pole parts on said stationary and movable poles for augmenting the oscillatory movement of said member.

3. In an electric motor; a field comprising stationary poles, a rotary armature and an oscillatory member having magnetic portions movable along the length of said poles, means journalling said member for free oscillatory movement about the axis of rotation of said armature, means for establishing a pulsating field threading said poles and the space in which the magnetic portions of said member and armature move, and torsionally resilient means connected with said member for causing said member to oscillate with such periodicity that it moves in one direction when said field is strong and in the other direction when said field is weak thereby to drive said armature in the said one direction and at synchronous speed.

4. In an alternating current motor; a magnetic frame comprising circumferentially spaced stationary poles of substantially arcuate length and an oscillatory member having poles of lesser arcuate length radially spaced from the stationary poles, resilient means connected with said member and imparting a predetermined periodicity of oscillatory movement thereto, means for establishing a magnetomotive force between said poles whereby said member oscillates in one direction on peaks of said magnetomotive force and in the other direction when said magnetomotive force is weak, and a rotary armature having a magnetic rim extending into the annular space between said poles thereby to be driven in said one direction.

5. In an electric motor; a magnetic pole having a face of substantial length, an armature having a pole adjacent said magnetic pole and of lesser length, and an oscillating member having a pole of substantially the same length as that of said armature and on the other side thereof from said magnetic pole, and torsionally resilient means supporting said member and responsive to the excitation of said magnetic pole with a pulsating magnetomotive force for permitting said member to oscillate in unison with the pulsations of said magnetomotive force thereby to drive said armature in one direction.

6. In an alternating current electric motor; a magnetic pole having a face of substantial length, an armature having a pole movable adjacent said magnetic pole and of lesser length, an oscillatory member having a pole of substantially the same length as that of said armature and on the other side thereof from said magnetic pole, said member completing the magnetic circuit back to said magnetic pole, resilient means urging said member to a predetermined position, and means responsive to the energization of said magnetic pole with a pulsating magnetomotive force for causing said member to oscillate with the same periodicity as the pulsations of said field and thereby to drive said armature in one direction.

7. In an electric motor; a field structure comprising circumferentially spaced poles, means for exciting said structure with a pulsating magnetomotive force, an armature having spaced pole parts and rotatably mounted between the spaced poles of said field structure, and means mounted co-axially with said armature for maintaining each pole part thereof in power receiving relationship with the adjacent pole of the field structure during a substantial part of each cycle of excitation of said structure, said means having circumferentially spaced poles equal in number to the number of poles in the field structure, said means being resiliently urged toward a position wherein its poles are angularly spaced from the poles of said field structure, said means when so urged having a periodicity of oscillation equal to the periodicity with which said field structure is excited.

8. In an electric motor; a field structure comprising radially spaced poles, means for exciting said structure with a pulsating magnetomotive force, an armature having spaced pole parts and rotatably mounted so the spaced poles run in the annular space between the spaced poles of said structure, and means for maintaining each pole part of the armature in power receiving relation with the adjacent pole of the field structure during a substantial part of each cycle of excitation of said structure, said means comprising an oscillatory member mounted co-axially with said armature and having pole parts corresponding to those of said armature, and resilient means continuously urging said member toward a position where its poles are angularly spaced from the poles of the field structure, whereby excitation of the field structure will cause movement of said member toward a position of alignment of its poles with the poles of the field.

9. In an electric motor; a field structure comprising a plurality of circumferentially spaced stationary poles and an equal number of circumferentially spaced movable poles, said movable poles being resiliently urged toward a position angularly spaced from the corresponding stationary poles, means for exciting said field structure with a pulsating magnetomotive force whereby said movable poles oscillate in unison with the pulsation of said magnetomotive force, and a rotatable armature having a magnetic part thereon extending into the space between said stationary and movable poles.

10. In a synchronous electric motor; a rotatable armature having a peripheral pole, a field structure comprising a pole on each side of the armature pole mutually supported for relative rotary movement about the axis of rotation of said armature, one of said field poles being stationary, means acting between said field poles and resiliently urging them toward predetermined angularly spaced positions, and means for energizing said field structure by a pulsating magnetomotive force.

11. In a synchronous electric motor; a rotatable armature having a peripheral pole, a field structure comprising a pole on each side of the armature pole one of said field poles being fixed, means acting between said field poles and resiliently urging them toward predetermined angularly spaced positions, and means for energizing said field structure by a pulsating magnetomotive force, the said angular spacing of said field poles being less than 90 electrical degrees.

12. In an electric motor; spaced stationary poles, an oscillatory member also having poles of substantially lesser circumferential length than said stationary poles and spaced therefrom, resilient means urging said oscillatory member toward a position where the poles thereof are adjacent one end of the said stationary poles, means responsive to the excitation of said stationary poles by a pulsating magnetomotive force for causing said oscillatory member to oscillate in unison with said pulsations thereby to carry the pole thereof to and fro along the length of said stationary poles, and a rotor having a magnetic rim part spaced between said poles whereby it is driven in one direction by the magnetomotive force between said poles as movement of said oscillatory member causes said magnetomotive force to shift along the line of said stationary poles.

13. In an electric motor; coaxially mounted rotary and oscillatory members, said oscillatory member having circumferentially spaced poles, a stationary field structure surrounding said members, and having circumferentially spaced poles equal in number to those on said oscillatory member a torsion spring connected to said oscillatory member for imparting a predetermined period of oscillation thereto and for urging it toward a position where its poles are circumferentially spaced from those of said stationary structure, means to excite said stationary structure with a pulsating magnetomotive force with the same frequency as said predetermined period whereby said oscillatory member vibrates in unison with said pulsation, and a rim part on said armature comprising spaced magnetic parts lying in the space between said oscillatory member and said stationary structure.

14. In an electric motor; a ring comprising opposite leg parts permanently magnetized, and other opposite legs of soft iron, coils on the soft iron legs whereby an alternating current in said coils produces a magnetomotive force between opposite corners of said ring on alternate half cycles of current therein, a magnetic bridge connecting one pair of said opposite corners, stationary poles extending inwardly from the other pair of corners, a rotor having a magnetic rim part adjacent the faces of said poles and of substantially lesser circumferential length and rotatably mounted on said bridge, an oscillatory member resiliently mounted on said bridge and having poles corresponding to those of the armature, other pole parts on said stationary poles and out of the plane of said armature, and other pole parts on said oscillatory member adjacent the said other pole parts of said stationary poles and disposed less than 90 electrical degrees therefrom when said resilient means is at rest.

15. In an electric motor; a field structure comprising spaced sets of stationary poles, said sets of poles defining a circular space therebetween and the poles of one set of substantially greater circumferential length than those of the other set, member having spaced poles thereon and rotatably mounted so the said spaced poles extend into the space between said sets of stationary poles, resilient means normally urging said member toward a position where the said poles thereon are angularly displaced from the poles of said other set in said structure whereby excitation of the said structure with a pulsating magnetomotive force will cause said member to oscillate, and an armature rotatably mounted co-axially with said member and having magnetic parts extending into the space between the poles of said member and the said one set of said stationary poles.

JAMES M. HUSH.

REFERENCES CITED

The following references are of record in the file of this patent:

UNITED STATES PATENTS

| Number | Name | Date |
| --- | --- | --- |
| 1,867,315 | Hammond | July 12, 1932 |
| 1,917,172 | Warren | July 4, 1933 |